3,151,131
VITAMIN-A-ACID AZIDE AND PROCESS FOR PREPARING IT
Heinrich Ruschig, Bad Soden, Taunus, and Günther Seidl, Frankfurt am Main, Germany, assignors to Farbwerke Hoechst Aktiengesellschaft vormals Meister Lucius & Brüning, Frankfurt am Main, Germany, a corporation of Germany
No Drawing. Filed Mar. 22, 1963, Ser. No. 266,322
Claims priority, application Germany, Mar. 28, 1962,
F 36,398
1 Claim. (Cl. 260—349)

It was found that the hitherto not described vitamin-A-acid azide is obtained in a simple manner in pure form and in practically quantitative yield by causing chloroformic acid alkyl ester to act on vitamin-A-acid in the presence of bases and reacting the product thus obtained without isolation into alkali metal azide.

The product obtained according to the process of the invention on the one hand shows in a weakened form the reactivity of the acid halides without the drawback of being sensitive to moisture, on the other hand a higher reactivity than the acid itself or its esters which amongst others is demonstrated by the fact that it can be reduced in aqueous organic solvents such as methanol/water or dioxane/water into the corresponding alcohol, by means of sodium-boron hydride or in ether by means of lithium aluminum hydride.

As chloroformic acid esters there are preferred those derived from low molecular aliphatic alcohols such as methanol, ethanol, propanol and butanol. Other esters, for instance those derived from higher molecular aliphatic or araliphatic alcohols such as benzyl alcohol, actanol, dodecanol and stearyl alcohol; the easily accessible methyl esters and ethyl esters being preferred.

The reaction is suitably carried out by suspending the vitamin-A-acid in an aqueous organic solvent and adding a slight molar excess of an organic base such as triethylamine, whereby the acid is dissolved. Applying a higher molar excess does not bring any practical advantage. A molar amount, preferably however an excess of chloroformic acid ester is then added, while cooling, and additionally stirred for a short time in the ice bath. Without isolating the mixed anhydride that has formed, a concentrated aqueous solution of sodium azide is dropwise added whereby the vitamin-A-acid azide precipitates after a short period and can be filtered off with suction.

As solvents there are preferably used liquids miscible with water, for insance dioxane, tetrahydrofurane and ketones of low molecular weight, preferably acetone and methyl-ethyl-ketone. As bases there are suitably used inorganic bases soluble in the reaction medium or tertiary organic bases such as sodium and potassium hydroxide, pyridine, dimethylaniline, trimethylamine, N-methylpiperidine, N-ethyl-morpholine, endo-ethylene-piperazine, preferably triethylamine. The reaction is suitably carried out at a temperature between $-20°$ C. and $+10°$ C., since the yield is reduced by applying higher temperatures and the reaction velocity is reduced by applying lower temperatures.

Since the vitamin-A-acid azide shows a considerably deeper tint than that of other vitamin A preparations the vitamin-A-azide can be used in addition to fodder, for instance as dyestuff, for intensifying the yellow color of the yolk of eggs and as medicament against poultry coccidiosis. Furthermore, it shows a considerable vitamin A action and in contradistinction to the vitamin A an unlimited stability.

The following examples serves to illustrate the invention but it is not intended to limit it thereto:

*Example*

21 grams of vitamin-A-acid are suspended in 20 cc. of water and 60 cc. of acetone. While cooling with ice, a solution of 12 cc. of triethylamine in 60 cc. of acetone is dropwise added. Upon complete dissolution of the acid there are dropwise added at $0°$ C. 9 cc. of chloroformic acid ethyl ester and after further 30 minutes a solution of 7 grams of sodium azide in 13 cc. of water. The mass is then stirred for a further hour at $0°$ C. and the vitamin-A-acid azide is filtered off with suction. Yield: 22.7 grams of a melting point of 84–85.5° C. (with decomposition). After recrystallization from methanol and a small amount of water the red needles melt at 85–86° C.

$$E_{max.} = 40.10^3, \quad \lambda_{max.} = 386 \; m\mu.$$
$$(E_{1\;cm.}^{1\%} = 1130.)$$

We claim:
Vitamin-A-acid azide.

References Cited in the file of this patent
UNITED STATES PATENTS
3,079,403   Weinstock _____ Feb. 26, 1963